(12) United States Patent
Liu et al.

(10) Patent No.: US 8,139,472 B1
(45) Date of Patent: Mar. 20, 2012

(54) BIT SWAP ARCHITECTURE IN DIGITAL SUBSCRIBER LINE COMMUNICATION SYSTEMS

(75) Inventors: Peter Tze-Hwa Liu, Alameda, CA (US); Jacky S. Chow, Mountain View, CA (US); Yi Han, San Jose, CA (US); Fay Yew, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 998 days.

(21) Appl. No.: 11/895,186

(22) Filed: Aug. 23, 2007

Related U.S. Application Data

(60) Provisional application No. 60/823,712, filed on Aug. 28, 2006.

(51) Int. Cl.
*H04J 11/00* (2006.01)
*H04L 5/12* (2006.01)

(52) U.S. Cl. .................... 370/207; 370/208; 375/265

(58) Field of Classification Search .................. None
See application file for complete search history.

(56) References Cited

U.S. PATENT DOCUMENTS

| | | | | |
|---|---|---|---|---|
| 5,533,008 | A * | 7/1996 | Grube et al. | 370/252 |
| 5,539,777 | A * | 7/1996 | Grube et al. | 375/316 |
| 5,606,577 | A * | 2/1997 | Grube et al. | 375/295 |
| 5,682,419 | A * | 10/1997 | Grube et al. | 455/450 |
| 6,134,273 | A * | 10/2000 | Wu et al. | 375/261 |
| 6,600,741 | B1 * | 7/2003 | Chrin et al. | 370/375 |
| 6,829,307 | B1 * | 12/2004 | Hoo et al. | 375/260 |
| 2001/0018719 | A1 * | 8/2001 | Francis | 710/22 |
| 2005/0031025 | A1 * | 2/2005 | Xie et al. | 375/222 |
| 2005/0169358 | A1 * | 8/2005 | Redfern et al. | 375/222 |
| 2005/0201480 | A1 * | 9/2005 | Jain | 375/265 |
| 2005/0213718 | A1 * | 9/2005 | Reina | 379/93.26 |
| 2005/0271129 | A1 * | 12/2005 | Reina | 375/222 |
| 2006/0023690 | A1 * | 2/2006 | Umashankar et al. | 370/351 |
| 2006/0176942 | A1 * | 8/2006 | Oksman et al. | 375/222 |
| 2006/0280237 | A1 * | 12/2006 | Rhee et al. | 375/222 |

OTHER PUBLICATIONS

ANSI® T1.413-1998 Revision of ANSI T1.413-1995; American National Standard for Telecommunications—Network and Customer Installation Interfaces—Asymmetric Digital Subscriber Line (ADSL) Metallic Interface; Secretariat Alliance for Telecommunications Industry Solutions; Approved Nov. 11, 1998; American National Standards Institute, Inc. 264 pages
Meeting, date: Geneva, Feb. 6-17, 2006; Source: Final draft text for G.993.2 (for prepublication); Contact: Les Brown, Texas Instruments; 260 pages.
International Telecommunications Union; ITU-T G.992.3 (Jul. 2002); Telecommunication Standardization Sector of ITU; Series G: Transmission Systems and Media, Digital Systems and Networks; Digital sections and digital line system—Access networks; Asymmetric digital subscriber line transceivers 2 (ADSL2); 312 pages.
Internationa Telecommunications Union; ITU-T G.992.5 (May 2003); Telecommunication Standardization Sector of ITU; Series G: Transmission Systems and Media, Digital Systems and Networks; Digital sections and digital line system—Access networks; 80 pages.

\* cited by examiner

*Primary Examiner* — Chirag Shah
*Assistant Examiner* — Suk Jin Kang

(57) ABSTRACT

A system includes a linked-list generator module that generates a linked list of tones based on tones and bit loads of the respective tones in a digital subscriber line (DSL) communication system, a trellis encoder module that encodes data bits associated with respective ones of the tones, and a bit application module that communicates the data bits to the trellis encoder module based on the linked list.

19 Claims, 13 Drawing Sheets

BIT SWAP ARCHITECTURE IN DIGITAL SUBSCRIBER LINE COMMUNICATION SYSTEMS

CROSS-REFERENCE TO RELATED APPLICATIONS

This application claims the benefit of U.S. Provisional Application No. 60/823,712, filed on Aug. 28, 2006. The disclosure of the above application is incorporated herein by reference in its entirety.

FIELD

The present disclosure relates to reordering tones and bit loadings in a digital subscriber line (DSL) communication system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A DSL communication system provides broadband digital communication over the traditional copper wiring that is used by the telephone network. Because DSL communication systems employ existing infrastructure they are an economically attractive solution to providing residential and commercial broadband service.

A version of DSL is described in the G.993.2 VDSL2 (Very high speed Digital Subscriber Line Transceivers 2) specification that is published by the International Telecommunication Union (ITU) and incorporated herein by reference in its entirety. VDSL2 describes in pertinent part a method for modulating data onto a plurality of carrier frequencies or tones that are carried over the copper wiring. Each tone has an associated signal-to-noise ratio and gain, which are referred to herein as the channel conditions. Each tone is modulated with a number of data bits that is based on the channel conditions associated with the tone. Each tone can therefore be modulated with a different number of bits. The number of bits is referred to as the bit loading. The bit loading of each tone is determined during an initialization sequence that is known to those skilled in the art. The material disclosed herein assumes that the bit loading has already been established for each tone.

Referring now to FIG. 1, a functional block diagram is shown of one of several embodiments of a VDSL2 communication system 10. Communication system 10 provides telephone and broadband communication services over copper wiring 12, which connects a customer location 14 to a telephone company switching station 16. Switching station 16 bridges copper wiring 12 to a broadband network 18 and a narrow-band network 20. An example of broadband network 18 such as the Internet. Examples of narrow-band networks 20 include Integrated Services Digital Network (ISDN) telephony and plain old telephone service (POTS). A high-pass filter 22 filters the VDSL2 tones to and from copper wiring 12 and a low-pass filter 24 filters ISDN or POTS signals to and from copper wiring 12.

A VDSL2 transceiver unit (VTU) or module 26 demodulates the tones that it receives from high-pass filter 22 and modulates the tones that it communicates to high-pass filter 22. Data that comes from broadband network 18 is processed by a Transport Protocol Specific—Transmission Convergence (TPS-TC) module 28 and a Physical Medium Specific—Transmission Convergence (PMS-TC) module 29. It then is processed by a trellis encoder module 31 and constellation mapper module 32. It then is converted by an analog front end (AFE) module 33 before reaching VTU 26. Data that comes from VTU 26 is converted by AFE module 33 and then is processed by a constellation unmapper module 34 and a trellis decoder module 35. It then is processed by a PMS-TC module 36 and a TPS-TC module 37 before reaching broadband network 18.

The configuration of the VDSL2 equipment at customer location 14 is similar to the configuration at switching station 16. Customer premises wiring 40 connects to copper wiring 12. A high-pass filter 42 filters the VDSL2 tones to and from premises wiring 40 and a low-pass filter 44 filters ISDN or POTS signals to and from premises wiring 40. Low-pass filter 44 filters the ISDN or POTS signals to/from a telephone set, voiceband modem, an ISDN channel, or the like. High-pass filter 42 filters the VDSL2 tones to/from a VTU 46. Data that comes from a home network 48 is processed through a TPS-TC module 50 and a PMS-TC module 51. It is then processed through a trellis encoder module 52 and a constellation mapper module 53. It is then processed through an AFE module 54 before reaching VTU 46. Data that comes from VTU 46 is processed through AFE module 54. It is then processed through a constellation unmapper module 55 and a trellis decoder module 56. It is then processed through a PMS-TC module 57 and a TPS-TC module 58 before reaching home network 48. Home network 48 provides networking connectivity between one or more pieces of customer provided equipment (CPE) 60, such as computers, printers, game consoles, voice over internet protocol (VOIP) telephones, digital televisions, and other such networked equipment.

Referring now to FIG. 2, a functional block diagram is shown of trellis encoder module 31. It should be noted that trellis encoder modules 31 and 50 operate similarly. An input at the left side of the block diagram receives a plurality of bits $u_1$-$u_z$, that are associated with two of the tones. The two tones are represented by the subscripts y and z. The number of received bits is between 1 and 15 for each tone and depends on the bit loading of each tone. Bit $u_1$ is the least significant bit.

A convolutional encoder module 64 generates a bit $u_0$ from bits $u_1$ and $u_2$. Bits $u_0$-$u_2$ are communicated to a mapper module 66 that implements Wei's 4D mapping algorithm. Mapper module 66 maps bits $u_0$-$u_3$ to four output bits $w_0$, $w_1$, $v_0$, and $v_1$. Mapper module 66 can employ the equations, $w_0 = u_2 \oplus u_3$, $w_1 = u_0 \oplus u_1 \oplus u_2 \oplus u_3$, $v_0 = u_3$, and $v_1 = u_1 \oplus u_3$ to generate bits $w_0$, $w_1$, $v_0$, and $v_1$, respectively.

Referring now to FIG. 3, a functional block diagram is shown of an embodiment of convolutional encoder module 64. Bit $u_2$ communicates with a first input of a first adder module 70. Bit $u_1$ communicates with a first input of a second adder module 72. A first delay flip-flop 74 includes an input and an output that communicates with a second input of first adder module 70. The input of first delay flip-flop 74 communicates with an output of a fourth delay flip-flop 76. An output of first adder module 70 communicates with an input of a second delay flip-flop 78. An output of second delay flip-flop 78 communicates with an input of a third delay flip-flop 80 and a second input of second adder module 72. An output of third delay flip-flop 80 communicates with a third input of second adder module 72. An output of second adder module 72 communicates with an input of fourth delay flip-flop 76.

Trellis encoder module 31 is naturally suited to encode tones that have a bit loading of at least two because its convolutional encoder module 64 and mapper module 66 map the two least significant bits $u_1$ and $u_2$ to the four bits $w_0, w_1, v_0$, and $v_1$. Nonetheless, some DSL systems, such as ADSL2, ADSL2+, VDSL, and VDSL, collectively referred to as XDSL, allow a tone to have a bit loading of one.

Since trellis encoder module 31 needs at least two input bits, it cannot encode data for tones that have a bit loading of one. XDSL systems therefore employ a tone re-ordering scheme that pairs together tones that have a bit loading of one so that the data bits for the paired tones can be applied to trellis encoder module 31 and provide two input bits. The initialization sequence that assigns the bit loadings facilitates the tone reordering and pairing scheme by assuring that an even number of tones, if any, will have a bit loading of one. The tone reordering scheme is computationally intensive and uses memory to maintain several tone and bit loading tables. XDSL can employ up to a maximum of 4096 tones that are reordered by the tone reordering scheme.

Referring now to FIG. 4, a data diagram is employed to show the tone reordering scheme via an example that includes 23 tones. A tone ordering table t includes numbers that represent respective ones of the tones. The tones are ordered from left to right in the sequence that they will be transmitted. A bit allocation table b includes the bit loading of each tone as determined by the initialization sequence. The entries in table b are ordered by tone number, e.g. tone 1 has a bit loading of zero (i.e. the channel conditions are too poor to carry data), tone 2 has a bit loading of one, tone 3 has a bit loading of two, etc. In this example table b shows that tones 2, 6, 8, 13, 14, and 19 have a bit loading of one.

The tone reordering scheme generates a re-ordered tone table t' based on tables t and b. Table t' is formed by beginning with table t and moving the tones with a bit loading of one to the end of table t'. Moving the tones with a bit loading of one to the end of table t' facilitates pairing those tones so that they can be applied to trellis encoder module 31.

The tone reordering scheme also generates a re-ordered bit table b' based on tables t' and b. Table b' is formed by beginning with table b and pairing the bit loadings of one at the end of the table as shown at 80. The beginning of table b' is padded with zeroes (the first three zeroes in this example) to backfill the bit loading spaces that were emptied by the paired bits. The zeroes from the table b are also moved to the beginning of table b'.

During normal operation or show time, trellis encoder module 31 receives the data bits that are associated with each tone. The data bits are applied to trellis encoder module 31 in the order that is shown in table t', with an exception that the tones that have a bit loading of zero (e.g. tones 1, 9, 11, and 20 in this example) are ignored and not transmitted. At 82 the tones are shown in the order, left to right, that they are applied to the trellis encoder module 31. The bit loadings of each tone are shown at 84. The paired bit loads of one are indicated as a bit loading of 1+1. The tones with a bit loading of zero are shown in descended positions as placeholders for the purpose of explanation. It should be appreciated that tones with a bit loading of one are not actually applied to trellis encoder module 31.

Referring now to FIG. 5, a functional block diagram is shown of a pertinent part of an electronic circuit 100. Electronic circuit 100 includes a (b', t')-list generator module 102 and a bit application module 104. (b', t')-list generator module 102 executes computer instructions or software to generate the t' and b' tables. Bit application module 104 applies the user data, which will be carried over the tones, to trellis encoder module 31 in accordance with the bit loading. Bit application module 104 can be implemented with combinatorial and/or sequential logic.

(b', t')-list generator module 102 includes a processor 106, such as an ARM processor, that generates tables t' and b' based on tables t and b. Processor 106 also receives a bit swap signal 108 that indicates the t' and b' tables need to be updated because the b and t tables have changed. Processor 106 generates a sync info signal 110 that indicates when the t' and b' tables have been updated.

Bit application module 104 includes double buffers 112 that store the present values of tables t' and b' and copies of the updated values of tables t' and b'. During normal operation or "show time", bit application module 104 applies data to trellis encoder module 31 in accordance with the present t' and b' tables. Bit application module 104 replaces the present t' and b' tables with the updated t' and b' tables in accordance with sync info signal 110.

Processor 106 communicates the updated b' and t' tables to bit application module 104 via a communication bus 114. Tables t' and b' are about 4096 entries each, where each entry contains 12 bits of t' to accommodate 4096 index and 4 bits of b' to accommodate 0 to 15 possible bit load. The bandwidth of communication bus 114 therefore must be high enough to pass tables t' and b' without causing bit application module 104 to overflow and/or drop data. Communication bus 114 can therefore be implemented with a direct memory access (DMA) or other type of simple single read/write architecture. However, these architectures occupy a considerable die area in electronic circuit 100. Tables t, b, t', and b' also require a considerable amount of memory, which also requires die area. Processor 106 also employs scratchpad memory while generating tables t' and b', and the scratchpad memory also requires die area.

SUMMARY

A system includes a linked-list generator module that generates a linked list of tones based on tones and bit loads of the respective tones in a digital subscriber line (DSL) communication system, a trellis encoder module that encodes data bits associated with respective ones of the tones, and a bit application module that communicates the data bits to the trellis encoder module based on the linked list.

In other features a first pointer register is associated with the linked-list generator module and stores pointers that reference memory locations of the linked list. The linked-list generator module indexes into the linked list based on contents of the first pointer register. The linked-list generator module comprises a processor. The bit application module communicates the data bits to the trellis encoder module further based on the bit load table. The circuit can be included in an integrated circuit.

A system includes a linked-list generator module that generates a linked list of tones based on a tone table and a bit load table in a digital subscriber line (DSL) communication system, a first buffer that stores the linked list, a second buffer that stores differences between the linked list and a prior linked list that was based on a prior tone table and a prior bit load table, a third buffer that stores the prior linked list, a communication bus that communicates the differences to the second buffer, a trellis encoder module that encodes data bits associated with respective ones of the tones, and a bit application module that communicates the data bits to the trellis encoder module based on the prior linked list.

In other features a first pointer register is associated with the linked-list generator module and stores pointers that point to memory locations of the linked list. A second pointer register is associated with the bit application module and stores pointers that point to memory locations of the prior linked list. The linked-list generator module generates a synchronization signal and the differences are applied to the third buffer based on the synchronization signal such that the prior linked list is converted into a copy of the linked list.

In other features a fourth buffer stores differences between the bit load table and the prior bit load table, a fifth buffer stores the prior bit load table, and a second communication bus communicates the differences to the fourth buffer. The differences are applied to the fifth buffer based on the synchronization signal such that the prior bit load table is converted into a copy of the bit load table. The linked-list generator module includes an input that receives a signal indicating that the tone table and the bit load table are updated. The system can be included in an integrated circuit.

A method of operating a digital subscriber line (DSL) communication system includes generating a linked list of tones based on tones and bit loads of the respective tones in the digital subscriber line (DSL) communication system, encoding data bits associated with respective ones of the tones, and communicating the data bits to a trellis encoder module based on the linked list.

In other features the method includes updating a first pointer register with pointers that reference memory locations of the linked list. The method includes indexing into the linked list based on contents of the first pointer register. Generating the linked list of tones includes executing computer instructions that are stored on a computer readable medium. The method includes communicating the data bits to the trellis encoder module further based on the bit load table. An integrated chip can be provided that performs the method.

A method of operating a digital subscriber line (DSL) communication system includes generating a linked list of tones based on a tone table and a bit load table in the (DSL) communication system, storing the linked list, storing a prior linked list that was based on a prior tone table and a prior bit load table, storing differences between the linked list and a prior linked list, communicating the differences to a buffer, encoding data bits associated with respective ones of the tones, and communicating the data bits to a trellis encoder module based on the prior linked list.

In other features the method includes storing pointers that point to memory locations of the linked list. The method includes storing pointers that point to memory locations of the prior linked list. The method includes generating a synchronization signal and, in accordance with the synchronization signal, applying the differences to the prior linked list such that the prior link list is converted into a copy of the linked list. The method includes storing differences between the bit load table and the prior bit load table, storing the prior bit load table, and, in accordance with the synchronization signal, applying the differences to the prior bit load table such that the prior bit load table is converted into a copy of the bit load table. The method includes receiving a signal that indicates that the tone table and the bit load table are updated. An integrated chip can be provided that performs the method.

A system includes linked-list generator means for generating a linked list of tones based on tones and bit loads of the respective tones in a digital subscriber line (DSL) communication system, trellis encoder means for encoding data bits associated with respective ones of the tones; and bit application means for communicating the data bits to the trellis encoder module based on the linked list.

In other features first the system includes pointer register means for storing pointers that reference memory locations of the linked list and that is associated with the linked-list generator means. The linked-list generator means indexes into the linked list based on contents of the first pointer register means. The linked-list generator means comprises a processor means for executing computer instructions stored in a computer readable medium. The bit application means communicates the data bits to the trellis encoder means further based on the bit load table. An integrated circuit includes the system.

A system includes linked-list generator means for generating a linked list of tones based on a tone table and a bit load table in a digital subscriber line (DSL) communication system, first buffer means for storing the linked list, second buffer means for storing differences between the linked list and a prior linked list that was based on a prior tone table and a prior bit load table, third buffer means for storing the prior linked list, communication means for communicating the differences to the second buffer means, trellis encoder means for encoding data bits associated with respective ones of the tones, and bit application means for communicating the data bits to the trellis encoder means based on the prior linked list.

In other features the system includes first pointer register means for storing pointers that point to memory locations of the linked list and that is associated with the linked-list generator means. The system includes second pointer register means for storing pointers that point to memory locations of the prior linked list and that is associated with the bit application module. The linked-list generator means generates a synchronization signal and the differences are applied to the third buffer based on the synchronization signal such that the prior linked list is converted into a copy of the linked list. The system includes fourth buffer means for storing differences between the bit load table and the prior bit load table, fifth buffer means for storing the prior bit load table, and second communication bus means for communicating the differences to the fourth buffer means, wherein the differences are applied to the fifth buffer means based on the synchronization signal such that the prior bit load table is converted into a copy of the bit load table. The linked-list generator means includes input means for receiving a signal that indicates that the tone table and the bit load table are updated. An integrated circuit includes the system.

A computer program operates a digital subscriber line (DSL) communication system. The computer program is executed by one or more processors. The computer program can reside on a computer readable medium such as but not limited to memory, non-volatile data storage and/or other suitable tangible storage mediums. The computer program includes generating a linked list of tones based on tones and bit loads of the respective tones in the digital subscriber line (DSL) communication system, encoding data bits associated with respective ones of the tones, and communicating the data bits to a trellis encoder module based on the linked list.

In other features the computer program includes updating a first pointer register with pointers that reference memory locations of the linked list. The computer program includes indexing into the linked list based on contents of the first pointer register. Generating the linked list of tones includes executing computer instructions that are stored on a computer readable medium. The computer program includes communicating the data bits to the trellis encoder module further based on the bit load table. An integrated chip can be provided that performs the computer program.

A computer program operates a digital subscriber line (DSL) communication system. The computer program is executed by one or more processors. The computer program can reside on a computer readable medium such as but not limited to memory, non-volatile data storage and/or other suitable tangible storage mediums. The computer program includes generating a linked list of tones based on a tone table and a bit load table in the (DSL) communication system, storing the linked list, storing a prior linked list that was based on a prior tone table and a prior bit load table, storing differences between the linked list and a prior linked list, communicating the differences to a buffer, encoding data bits associated with respective ones of the tones, and communicating the data bits to a trellis encoder module based on the prior linked list.

In other features the computer program includes storing pointers that point to memory locations of the linked list. The computer program includes storing pointers that point to memory locations of the prior linked list. The computer program includes generating a synchronization signal and, in accordance with the synchronization signal, applying the differences to the prior linked list such that the prior link list is converted into a copy of the linked list. The computer program includes storing differences between the bit load table and the prior bit load table, storing the prior bit load table, and, in accordance with the synchronization signal, applying the differences to the prior bit load table such that the prior bit load table is converted into a copy of the bit load table. The computer program includes receiving a signal that indicates that the tone table and the bit load table are updated. An integrated chip can be provided that performs the computer program.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a data diagram of various tone and bit ordering tables that are employed by the DSL communication system in accordance with the prior art;

DETAILED DESCRIPTION

Figure 1:
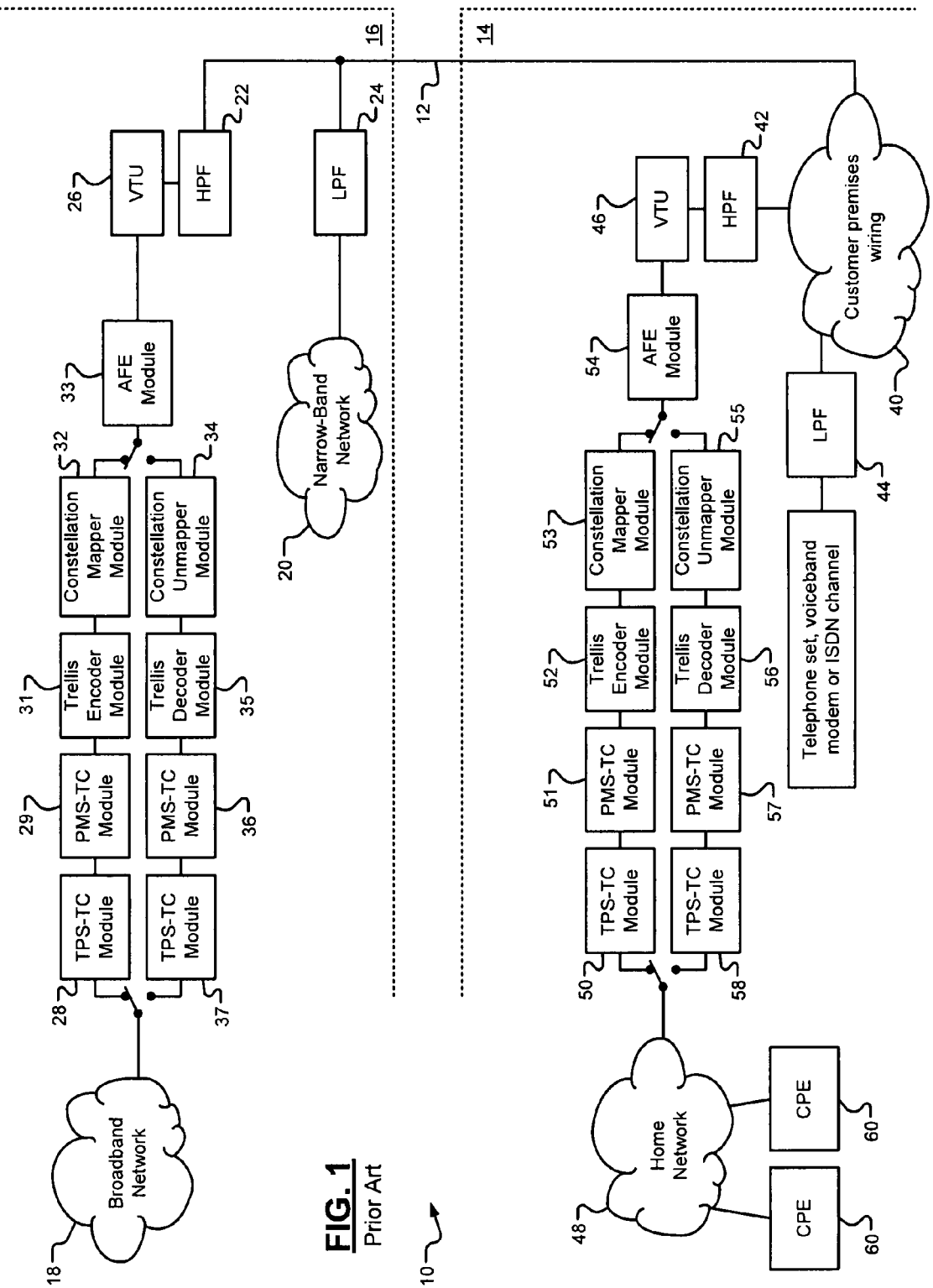
FIG. 1 is a functional block diagram of a digital subscriber link (DSL) communication system in accordance with the prior art.
Figure 2:
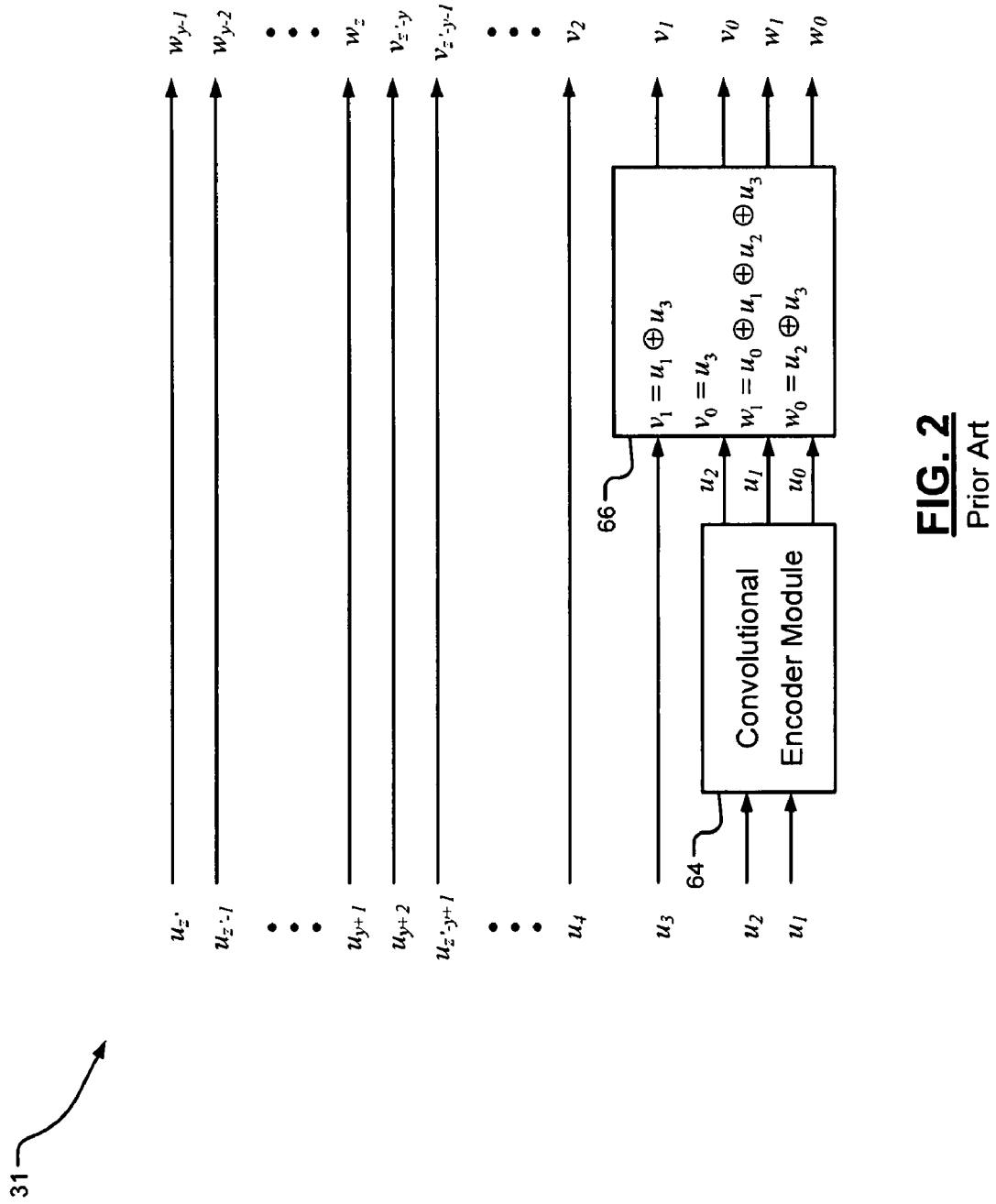
FIG. 2 is a functional block diagram of a trellis encoder module in accordance with the prior art.
Figure 3:
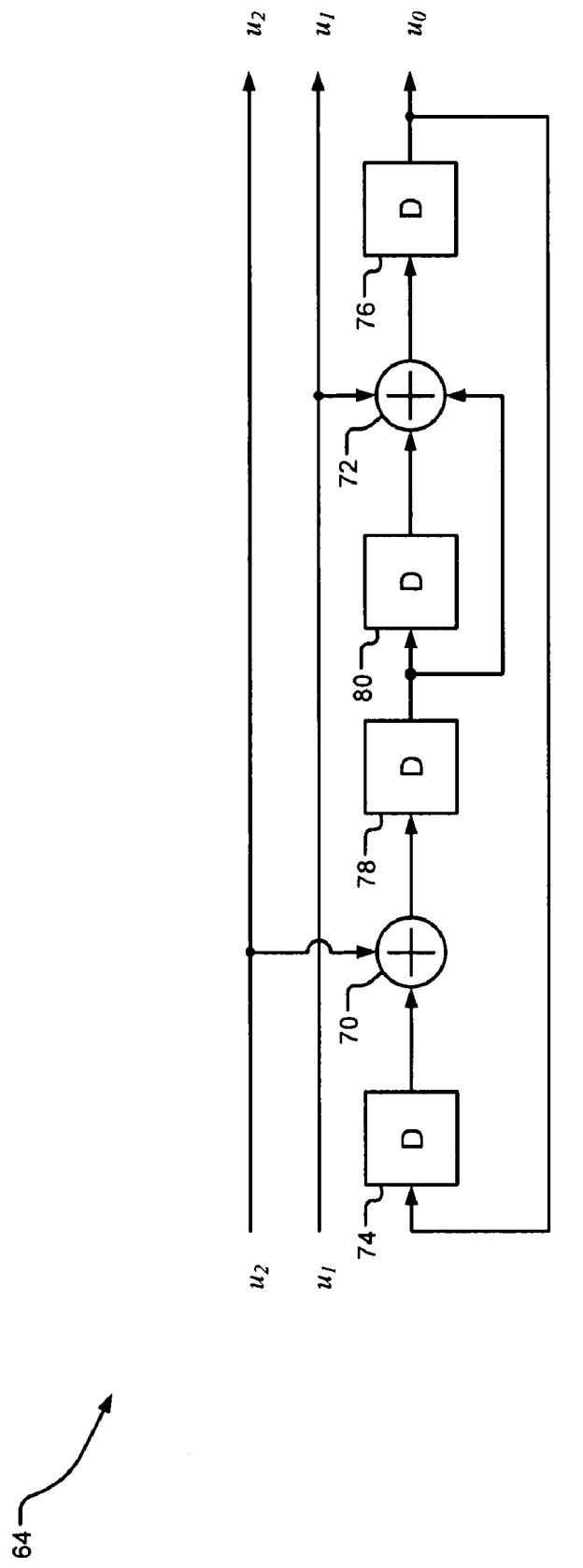
FIG. 3 is a functional block diagram of a convolutional encoder module that is shown in FIG. 2 in accordance with the prior art.
Figure 5:
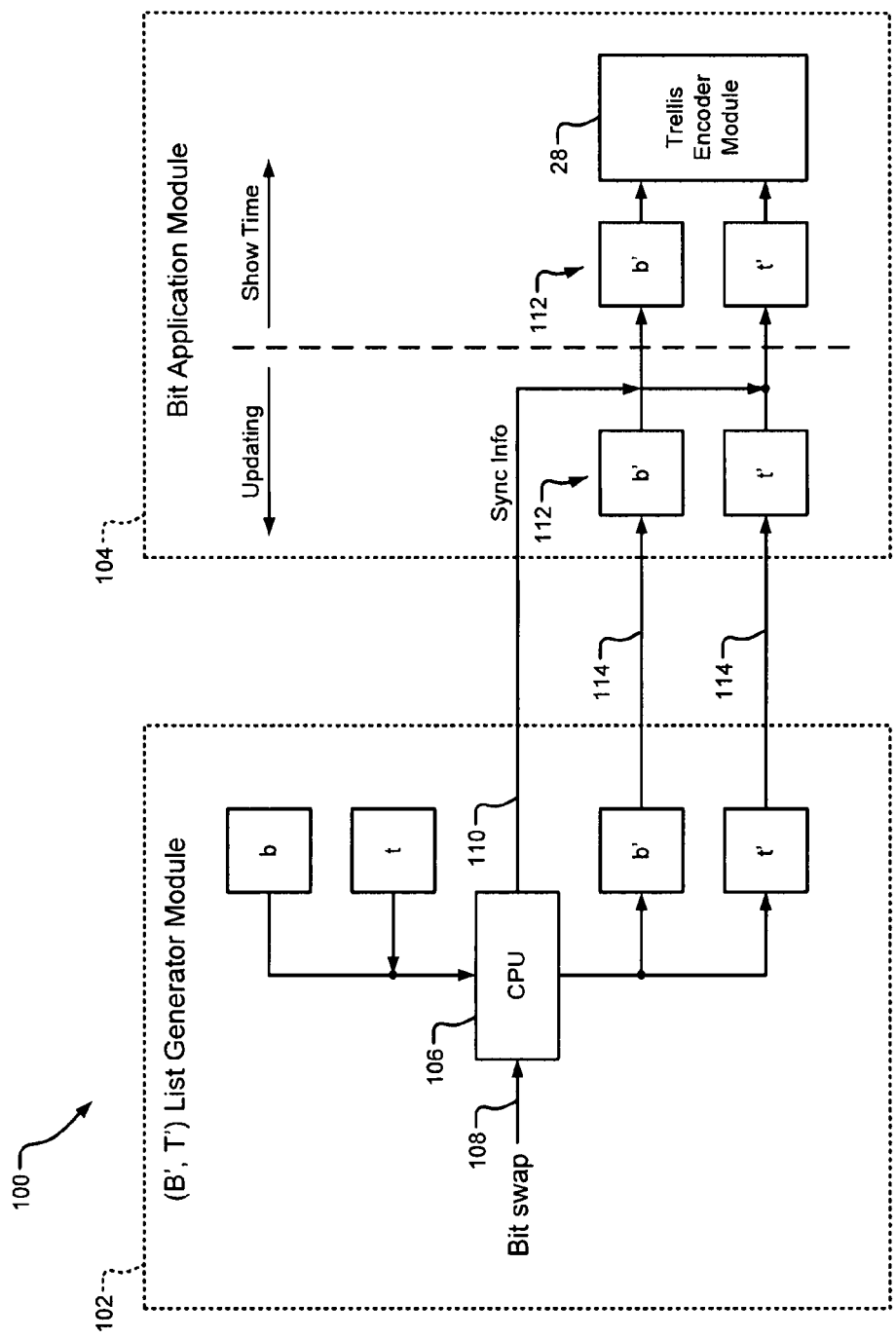
FIG. 5 is a functional block diagram of an application specific integrated circuit (electronic circuit) that implements the various tone and bit ordering tables, and the trellis encoder module in accordance with the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (electronic circuit), an electronic circuit, a processor (shared, dedicated, or group) and memory that execute one or more software or firmware programs, a combinational logic circuit, and/or other suitable components that provide the described functionality.

Figure 6:
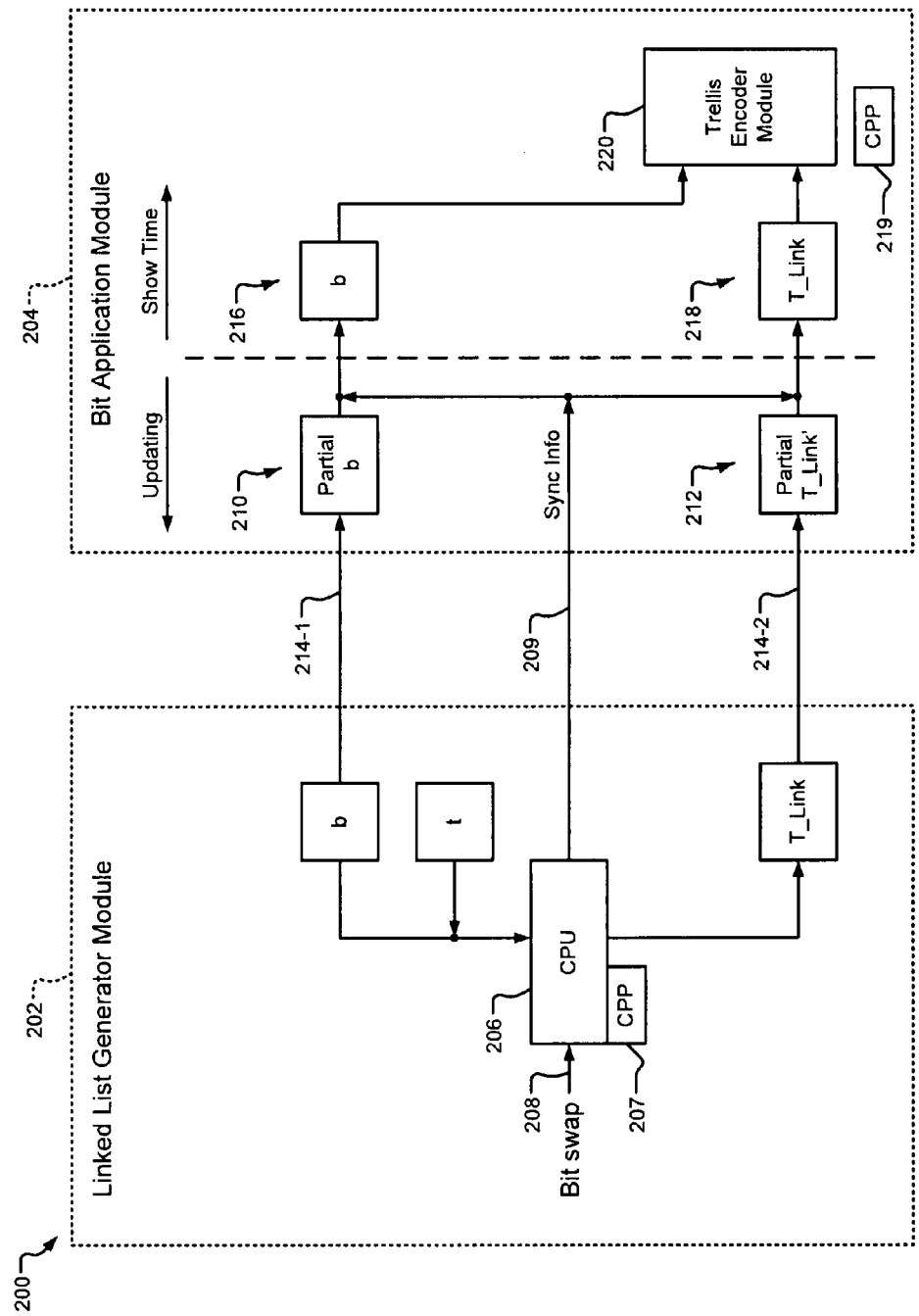
FIG. 6 is a functional block diagram of an electronic circuit that employs a linked list to reorder tones in a DSL communication system.

Referring now to FIG. 6, a functional block diagram is shown of a pertinent portion of an application-specific integrated circuit (electronic circuit) 200. Electronic circuit 200 can be used to implement bit and tone reordering schemes that are employed in XDSL communication systems. Electronic circuit 200 employs a linked-list data structure that provides the functionality of the re-ordered tone table t' of the prior art. The linked-list data structure tends to reduce the computational load and data throughput requirements of electronic circuit 200 when compared to other electronic circuits. The linked-list data structure thereby enables electronic circuit 200 to be produced with less die area and less cost when compared to the prior art.

Electronic circuit 200 includes a linked-list generator module 202 and a bit application module 204. Linked-list generator module 202 includes a processor 206 that generates a linked-list table T_Link based on the t and b tables. The T_Link table is described below in detail. The t and b tables are generated by an initialization routine and can be generated in accordance with the prior art. The t table lists the sequence that the XDSL tones will be transmitted. The b table lists the bit loadings for respective ones of the tones. Processor 206 updates a memory location and/or register 207 at it generates the T_Link table. The register stores a Current Process Pointer (CPP) that is described below in more detail.

Processor 206 can receive a bit swap signal 208 that indicates when the b and/or t tables have been updated. In a typical application the b and/or t tables can be updated infrequently or "once for a while"; such as when a telephone handset that is associated with the XDSL communication channel goes on-hook or off-hook. Processor 206 can generate a sync info signal 209 that indicates when processor 206 has updated the T_link table.

Bit application module 204 includes a first buffer 210 that stores an updated copy of the b table and a second buffer 212 that stores an updated copy of the T_Link table. Linked-list generator module 202 employs first and second data buses 214-1 and 214-2 to communicate the updated b and T_Link tables, or portions thereof, to respective ones of first buffer 210 and second buffer 212. Bit application module 204 copies the contents of first buffer 210 and second buffer 212 to a third buffer 216 and a fourth buffer 218, respectively, in accordance with sync info signal 209. Bit application module 204 includes a trellis encoder module 220 that implements a trellis code as described above. Bit application module 204 applies user data to trellis encoder module 220 in accordance with the present b and T_Link tables that are stored in third buffer 216 and fourth buffer 218, respectively.

Figure 7:
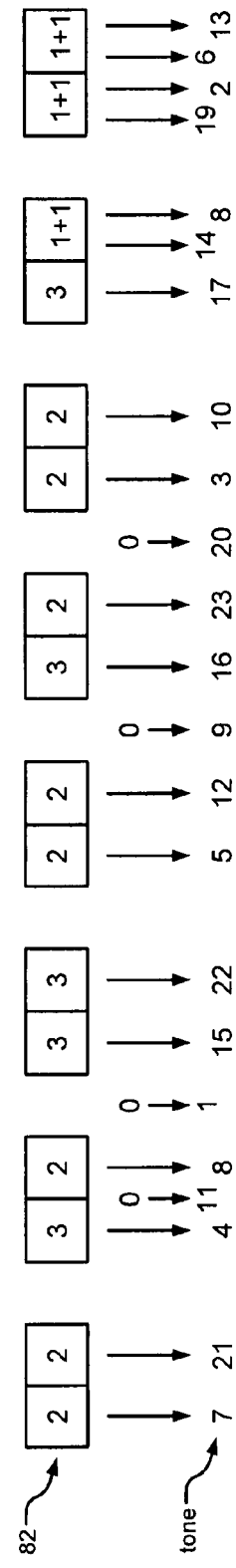
FIG. 7 is a data diagram that illustrates the linked list of FIG. 6.

Referring now to FIG. 7, a data diagram shows an example of the T_link table. The example is based on the same example t and b tables that are shown in FIG. 4. It should be appreciated that in a practical application the t and b tables will have substantially more entries that what is shown in the example. In some embodiments the t and b tables, and consequently the T_Link table, have 4096 entries. The example data diagram can be used with methods 250 and 320, which are described below, to further understand how the T_Link table is constructed and applied.

Figure 8A:
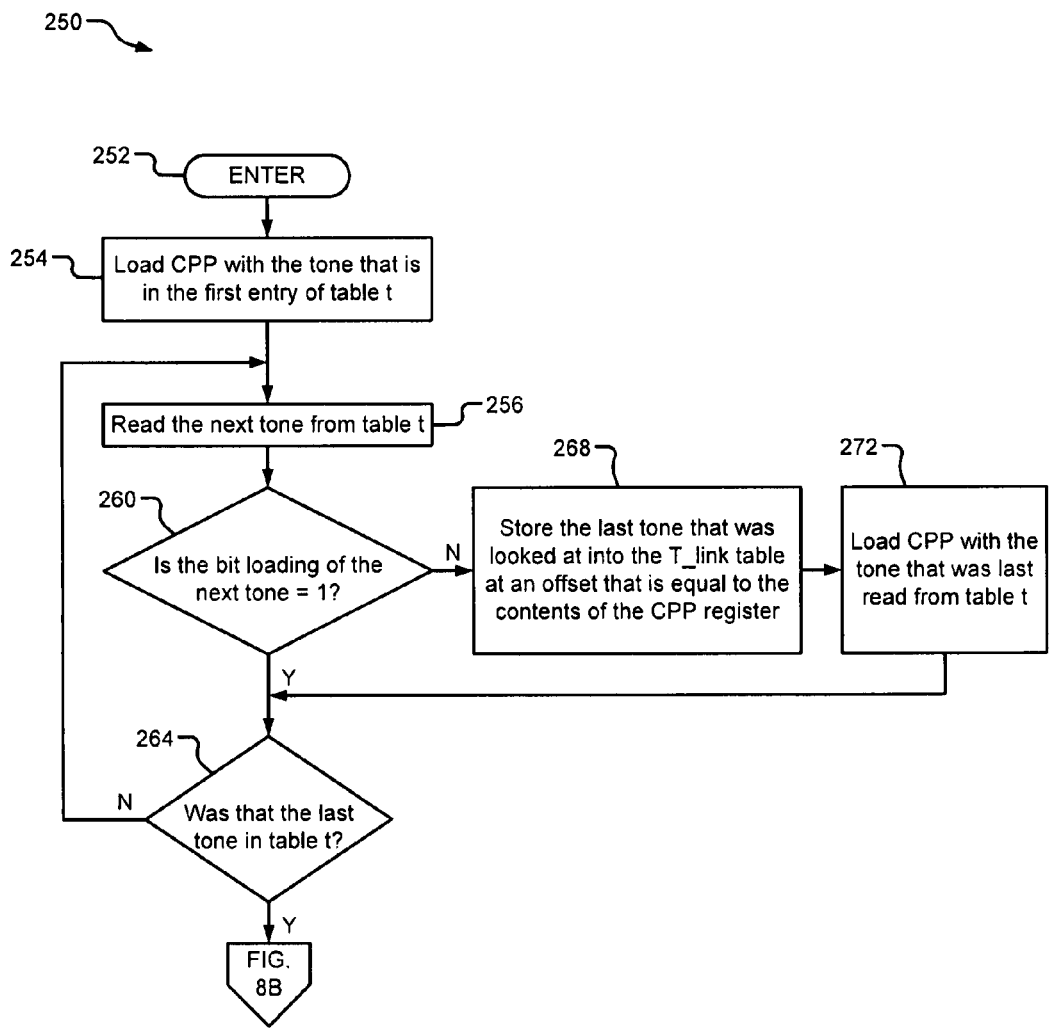
FIGS. 8A and 8B are a flowchart for generating the linked list.
Figure 8B:
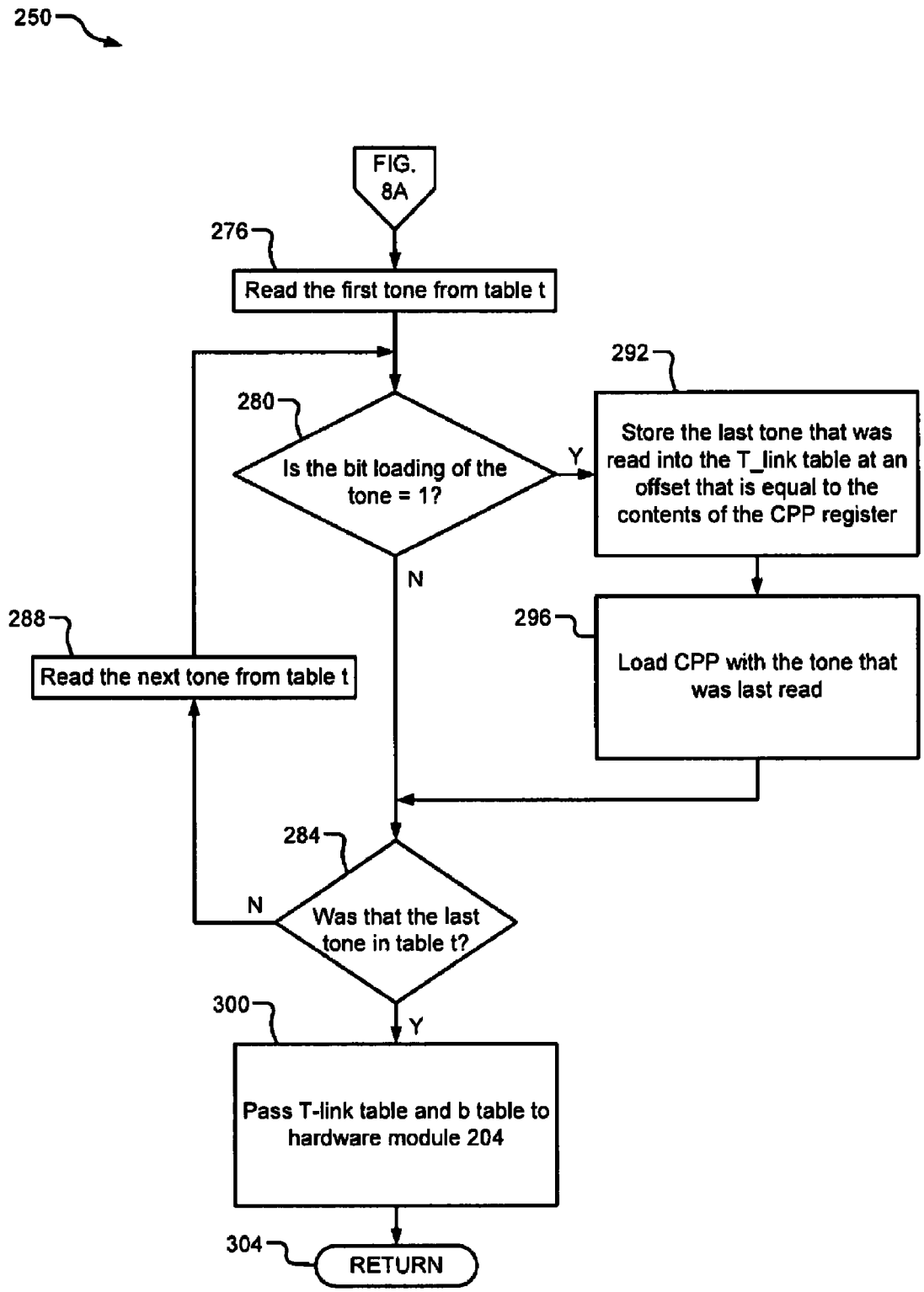

Referring now to FIGS. 8A and 8B, a flowchart is shown of a method 250 for generating the T_Link table. Method 250 can be executed by processor 206 and stored as computer instructions in a memory that is read by processor 206. Method 250 is executed after the t table and/or b table are updated and/or generated.

Control enters through block 252 and proceeds to block 254. In block 254 control loads CPP register 207 (shown in FIG. 6) with the tone that is in the first entry of table t. Control then proceeds to block 256 and reads the next tone from table t, e.g. one space to the right in the example of FIG. 7. Control then proceeds to decision block 260 and refers to the b table to determine whether the bit loading of the next tone is equal to one.

When the result is positive in decision block 260, control branches to decision block 264. In decision block 264, control determines whether the last tone that was looked at is also the last tone in table t. If not, then control returns to block 256.

Returning now to decision block 260, control branches from decision block 260 to block 268 when the result in decision block 260 is negative. In block 268 control stores into the T_Link table the last tone that was looked at. The present contents of CPP register 207 provide the offset into the T_link table. Control proceeds from block 268 to block 272 and loads CPP register 207 with the tone that was last looked at.

Returning now to the discussion of decision block 264, if control determines that the result is affirmative in decision block 264 then control branches to block 276 (shown in FIG. 8B). In block 276 control reads the first tone in table t. Control then proceeds to decision block 280 and determines whether the bit loading of the tone is one. If the result is negative then control branches to decision block 284 and determines whether the tone is also the last tone in table t. If it is not then control branches to block 288 and reads the next tone from table t. Control then returns to decision block 280.

Control branches to block 292 when decision block 280 determines that the last tone that was read from table t has a bit loading of one. In block 292 control stores the tone into the T_Link table at an offset that is provided by the present contents of CPP register 207. Control then proceeds to block 296 and stores the tone in CPP register 207.

Returning now to decision block 284, control branches to block 300 when control determines that the last tone has been read from table t. In block 300 control passes the newly generated T_link table table to second buffer 212 (shown in FIG. 6). Control can then return to other processes via block 304.

Figure 9:
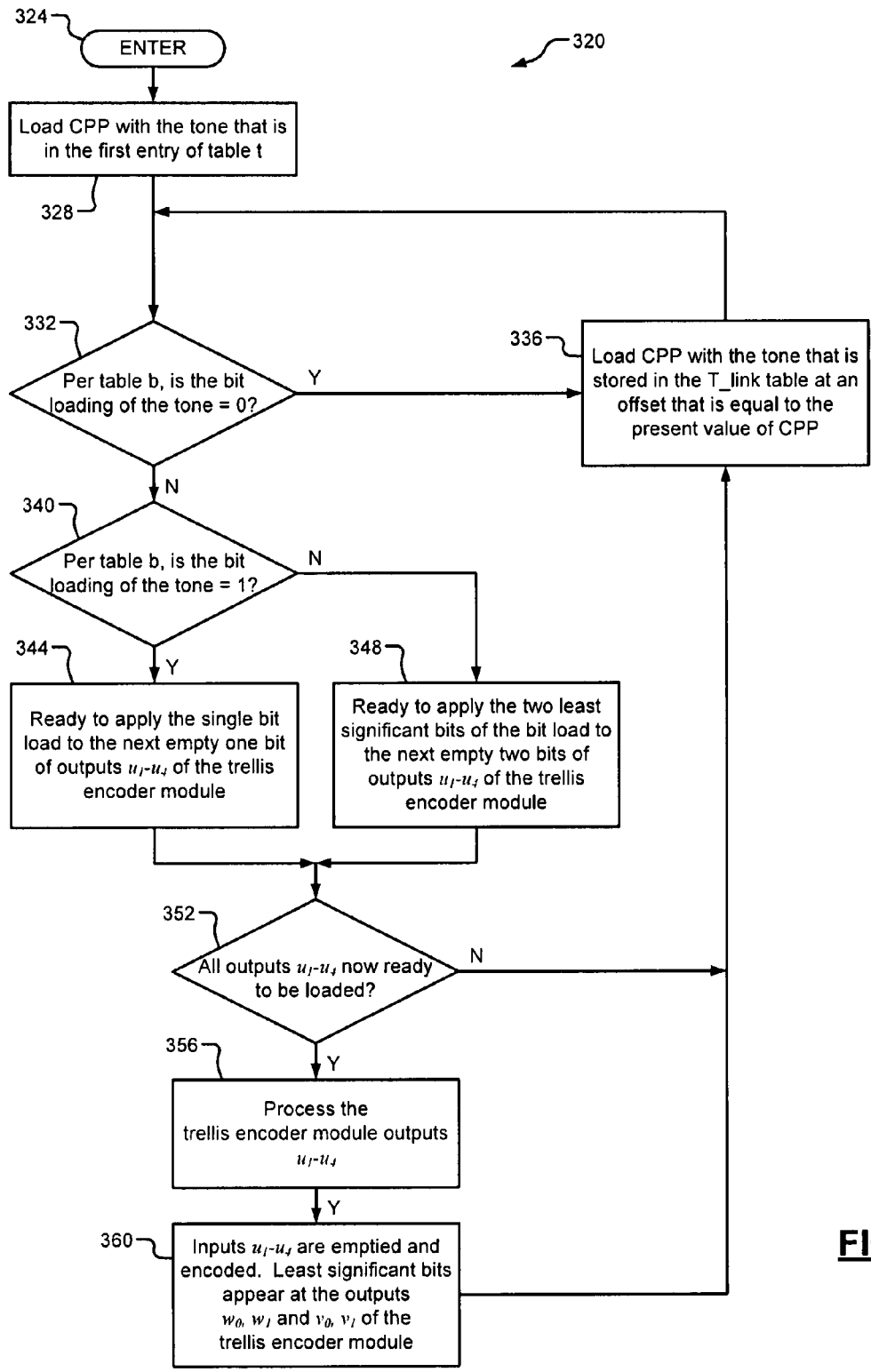
FIG. 9 is a flow chart of a method for applying tones to the trellis encoder module based on the linked list.

Referring now to FIG. 9, a method 320 is shown for determining how many bits to apply to trellis encoder module 220 for each tone. Method 320 employs the T_Link table and is executed by bit application module 204.

Control begins at block 324 and immediately proceeds to block 328. In block 328 control loads CPP register 219 with the tone that is in the first entry of table t. Control then proceeds to decision block 332 and determines whether the bit loading of the tone is equal to zero. If so, then control branches to block 336 and loads CPP register 219 with the tone that is stored in the T_Link table at an offset that is equal to the present value of CPP register 219. Control then returns to decision block 332.

Control branches from decision block 332 to decision block 340 when the bit loading of the tone in decision block 332 is not zero. In decision block 340 control determines whether the bit loading of the tone is equal to one. If not, then control branches to block 348 and is ready to apply the two least significant bits of the bit load to the next empty two bits of the outputs $u_1$-$u_4$ of trellis encoder module 220. On the other hand, if the result is negative in decision block 340 then control branches to block 344. In block 344 control is ready to apply the single bit of the bit loading to the next empty one of the outputs $u_1$-$u_4$ of trellis encoder module 220.

Control proceeds from blocks 344 and 348 to decision block 352. In decision block 352 control determines whether all of the outputs $u_1$-$u_4$ have bits are ready to be applied to them. If not, then control returns to block 336 to process another tone. Otherwise, control branches to block 356 and advance the trellis encoder module 64 by one more step. Control then proceeds to block 360 and generates encoded data bits at the output of trellis encoder module 360. Control then returns to block 336.

Figures 10A, 10B, 10C:
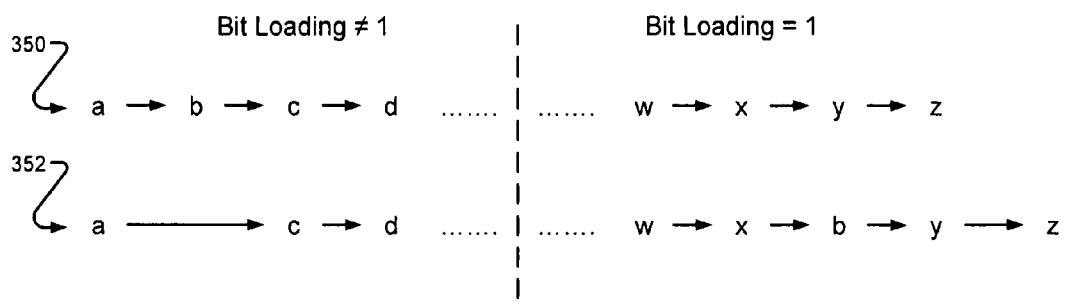
FIGS. 10A-10C are data diagrams that show the linked list before and after a tone table is updated.

Referring now to FIGS. 10A-10C a series of data diagrams show how entries in the b and T_Link table can be changed after the t table is updated by the initialization routine. Changing some entries in the b and T_Link tables tends to reduce the amount of data that is stored and communicated by first data bus 214-1 and second data bus 214-2 when compared to the prior art. The reduced amount of data reduces the local data buffer size and the bandwidth demands on first and second data buses 214-1, 214-2 and facilitates reducing the die size of electronic circuit 200.

In FIG. 10A an example tone re-order is shown. The lower-case letters a though z represent the tones and the respective order that they are transmitted. A first row 350 shows the tones before the t table is updated. A second row 352 shows the tones after the t table is updated. In this particular example, the tone b, which was originally loaded with more than one bit, is adapted to be loaded with only one bit such as may occur due to a slowly changing channel environment. As is described above, the T_Link table is structured so that the tones with bit loadings equal to one are the last tones to have their data applied to trellis encoder module 220. The tones with bit loadings that are unequal to one are the first tones to have their data applied to trellis encoder module 220. In the example of FIG. 10A the channel conditions and t table changed such that tone c follows tone a and tone b occurs between tones x and y. Tone b is also assigned a bit loading of one.

FIG. 10B shows the T_Link table that corresponds with the tones as shown in row 350 of FIG. 10A, i.e. before the t table changed. The capital letters represent tone index, i.e., address locations of the T_Table, and the lower-case letters represents the contents at that location, i.e., the next tones to be transmitted that are stored in the respective ones of the current address locations. For example, "in address A, the content is b" means the tone transmitted next to tone a is tone b.

FIG. 10C shows the T_Link table that corresponds with the tones as shown in row 352 of FIG. 10A, i.e. after the t table changed. The capital letters represent address locations of the T_Table and the lower-case letters represents the tones that are stored in the respective ones of the address locations. It should be appreciated that the contents of a few of the address locations had to be changed in the T_Link table to implement the updated t table. The contents of address A changed from b to c; the contents of address B changed from c to y; and the contents of address X changed from y to b.

This example shows that when the t table is updated the T_Link table needs three updates when a tone changes to or from a bit loading of one; a first update to break the old link, a second update to re-establish the broken link and a third update to insert the new link. It should also be appreciated that only this partial updated information (three updates in the example case) needs to be passed through buses 214-1 and 214-2 in this new architecture. This is less information than the entire table of b' and t' that need to be passed through bus 114 in the prior art.

Figure 11B:
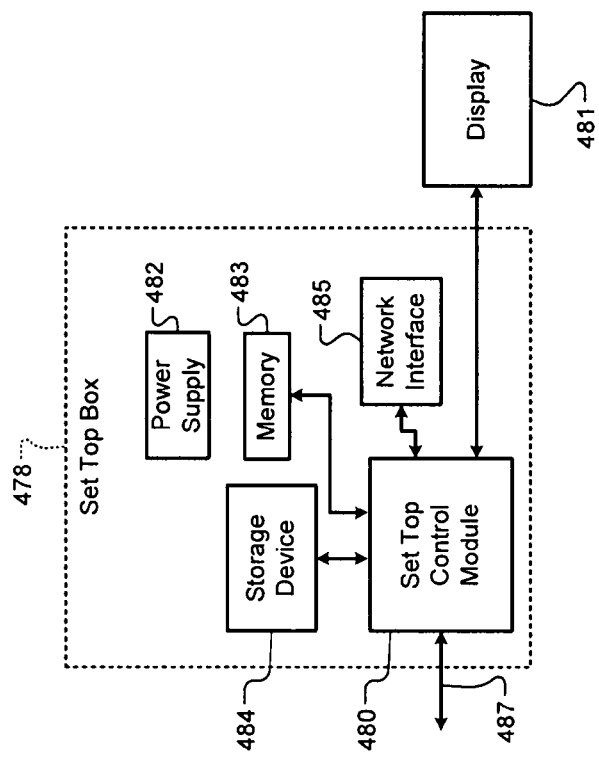
FIG. 11B is a functional block diagram of a set top box.
Figure 11A:
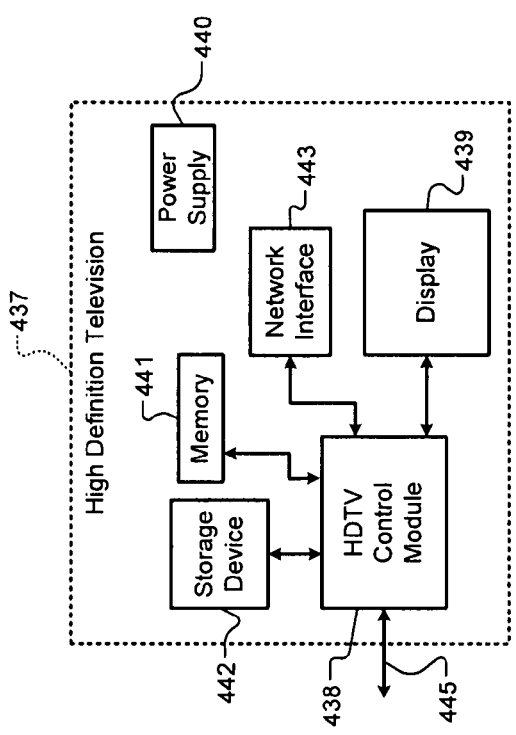
FIG. 11A is a functional block diagram of a high definition television.
Figure 11C:
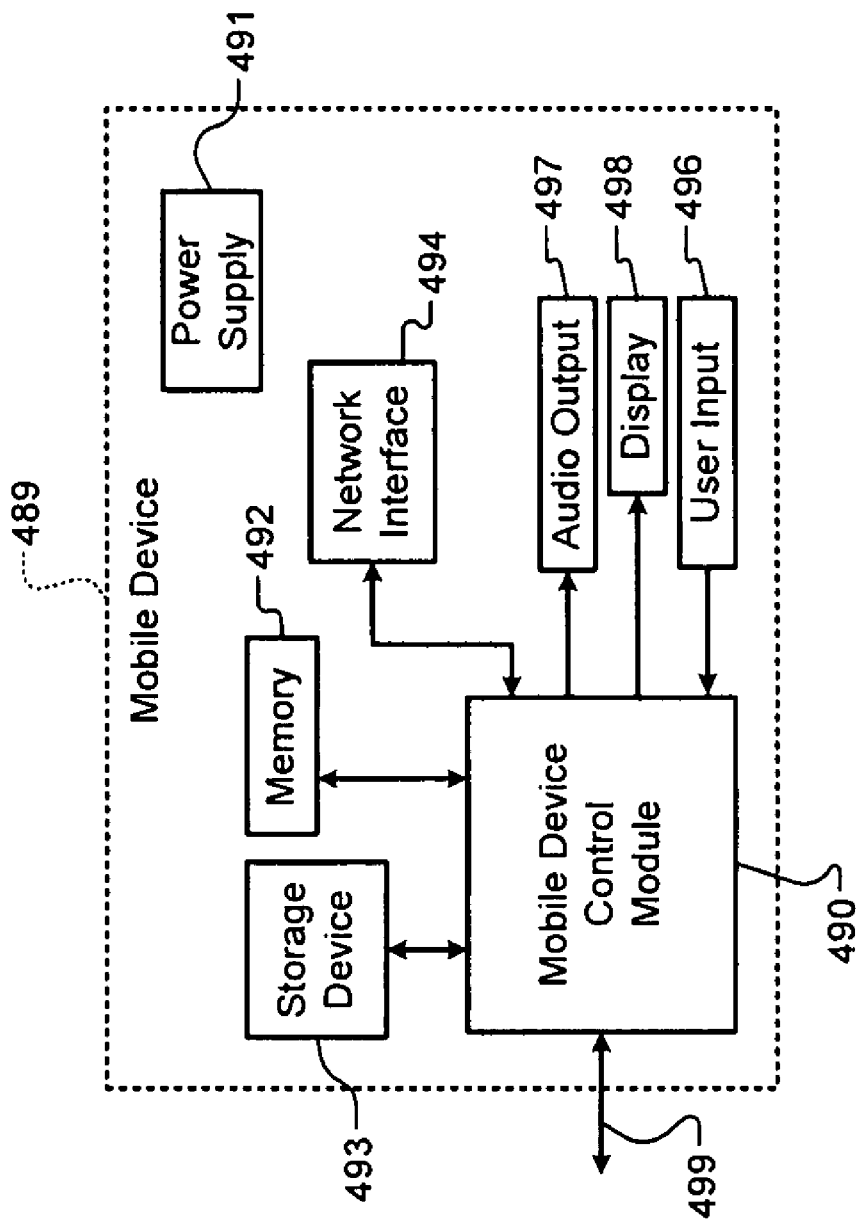
FIG. 11C is a functional block diagram of a mobile device.

Referring now to FIGS. 11A-11C, various exemplary implementations incorporating the teachings of the present disclosure are shown.

Referring now to FIG. 11A, the teachings of the disclosure can be implemented in a XDSL electronic circuit that is included in network interface 443 of a high definition television (HDTV) 437. The HDTV 437 includes a HDTV control module 438, a display 439, a power supply 440, memory 441, a storage device 442, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 11B, the teachings of the disclosure can be implemented in a XDSL electronic circuit that is included in a network interface 485 of a set top box 478. The set top box 478 includes a set top control module 480, a display 481, a power supply 482, memory 483, and a storage device 484. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Referring now to FIG. 11C, the teachings of the disclosure can be implemented in a XDSL electronic circuit that is included in a network interface 494 of a mobile device 489. The mobile device 489 may include a mobile device control module 490, a power supply 491, memory 492, a storage device 493, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a linked-list generator module configured to generate a linked list of tones based on (i) a tone table and (ii) a bit load table in a digital subscriber line (DSL) communication system;
    a first buffer configured to store the linked list;
    a second buffer configured to store differences between the linked list and a prior linked list, wherein the prior linked list is based on a prior tone table and a prior bit load table;
    a third buffer configured to store the prior linked list;
    a fourth buffer configured to store differences between the bit load table and the prior bit load table;
    a fifth buffer configured to store the prior bit load table;
    a first communication bus configured to communicate, to the second buffer, the differences between the linked list and the prior linked list;
    a second communication bus configured to communicate, to the fourth buffer, the differences between the bit load table and the prior bit load table:
    a trellis encoder module configured to encode data bits associated with respective ones of the tones; and a bit application module configured to communicate the data bits to the trellis encoder module based on the prior linked list and the prior bit load table, wherein the linked-list generator module is configured to generate a synchronization signal, wherein the differences between the linked list and the prior linked list are applied to the third buffer in response to the synchronization signal such that the prior linked list is converted into a copy of the linked list, and wherein the differences between the bit load table and the prior bit load table are applied to the fifth buffer in response to the synchronization signal such that the prior bit load table is converted into a copy oldie bit load table.

2. The system of claim 1, further comprising a first pointer register that is associated with the linked-list generator module, wherein the first pointer register is configured to store pointers that point to memory locations of the linked list.

3. The system of claim 2, wherein the linked-list generator module is configured to index into the linked list based on contents of the first pointer register.

4. The system of claim 1, further comprising a second pointer register that is associated with the bit application module, wherein the second pointer register is configured to store pointers that point to memory locations of the prior linked list.

5. The system of claim 1, wherein the linked-list generator module includes an input configured to receive a signal, wherein the signal indicates that the tone table and the bit load table have been updated.

6. An integrated circuit comprising the system of claim 1.

7. A method of operating a digital subscriber line (DSL) communication system, the method comprising:
generating a linked list of tones based on (i) a tone table and (ii) a bit load table in the DSL communication system;
storing the linked list;
storing a prior linked list that is based on (i) a prior tone table and (ii) a prior bit load table;
storing a prior bit load table:
storing differences between the linked list and the prior linked list;
storing differences between the bit load table and the prior bit load table;
communicating, to a first buffer, the differences between the linked list and the prior linked list;
communicating, to a second buffer, the differences between the bit load table and the prior bit load table;
using a trellis encoder module, encoding data bits associated with respective ones of the tones;
communicating the data bits to the trellis encoder module based on the prior linked list and the prior bit load table;
generating a synchronization signal;
in response to the synchronization signal, applying the differences from the first buffer to the prior linked list such that the prior linked list is converted into a copy of the linked list; and
in response to the synchronization signal, applying the differences from the second buffer to the prior bit load table such that the prior bit load table is converted into a copy of the bit load table.

8. The method of claim 7, further comprising updating a first pointer register with pointers that reference memory locations of the linked list.

9. The method of claim 8, further comprising indexing into the linked list based on contents of the first pointer register.

10. The method of claim 7, further comprising storing pointers that point to memory locations of the linked list.

11. The method of claim 7, further comprising storing pointers that point to memory locations of the prior linked list.

12. The method of claim 7, further comprising receiving a signal that indicates that the tone table and the bit load table have been updated.

13. The method of claim 7, further comprising performing steps of the method using an integrated circuit.

14. A system comprising:
linked-list generator means for generating a linked list of tones based on (i) a tone table and (ii) a bit load, table in a digital subscriber line (DSL) communication system;
first buffer means for storing the linked list;
second buffer means for storing differences between the linked list and a prior linked list, wherein the prior linked list is based on a prior tone table and a prior bit load table;
third buffer means for storing the prior linked list;
fourth buffer means for storing differences between the bit load table and the prior bit load table;
fifth buffer means for storing the prior bit load table;
first communication means for communicating, to the second buffer means, the differences between the linked list and the prior linked list;
second communication bus means for communicating, to the fourth buffer means, the differences between the bit load table and the prior bit load table;
trellis encoder means for encoding data bits associated with respective ones of the tones; and
bit application means for communicating the data bits to the trellis encoder means based on the prior linked list and the prior hit load table,
wherein the linked-list generator means generates a synchronization signal,
wherein the differences between the linked list and the prior linked list are applied to the third buffer means in response to the synchronization signal such that the prior linked list is converted into a copy of the linked list, and
wherein the differences between the bit load table and the prior bit load table are applied to the fifth buffer means in response to the synchronization signal such that the prior bit load table is converted into a copy of the bit load table.

15. The system of claim 14, further comprising first pointer register means for, storing painters that point to memory locations of the linked list, wherein the first pointer register means is associated with the linked-list generator means.

16. The system of claim 15, wherein the linked-list generator means indexes into the linked list based on contents of the first pointer register means.

17. The system of claim 14, further comprising second pointer register means for storing pointers that point to memory locations of the prior linked list, wherein the second pointer register means is associated with the bit application means.

18. The system of claim 14, wherein the linked-list generator means includes input means for receiving a signal that indicates that the tone table and the bit load table have been updated.

19. An integrated circuit comprising the system of claim 14.

* * * * *